US006925549B2

(12) United States Patent
Cook et al.

(10) Patent No.: US 6,925,549 B2
(45) Date of Patent: Aug. 2, 2005

(54) ASYNCHRONOUS PIPELINE CONTROL INTERFACE USING TAG VALUES TO CONTROL PASSING DATA THROUGH SUCCESSIVE PIPELINE STAGES

(75) Inventors: Peter William Cook, Bedford Corners, NY (US); Andrew Douglas Davies, Rochester, MN (US); Stanley Everett Schuster, Granite Springs, NY (US); Daniel Lawrence Stasiak, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 584 days.

(21) Appl. No.: 09/746,647

(22) Filed: Dec. 21, 2000

(65) Prior Publication Data

US 2002/0083298 A1 Jun. 27, 2002

(51) Int. Cl.[7] .............................................. G06F 15/00
(52) U.S. Cl. ....................................................... 712/25
(58) Field of Search ........................................... 712/25

(56) References Cited

U.S. PATENT DOCUMENTS 5,920,899 A * 7/1999 Chu ........................... 711/169
5,937,177 A * 8/1999 Molnar et al. ............... 712/200
6,163,839 A * 12/2000 Janik et al. .................. 712/219

OTHER PUBLICATIONS

Sproull et al, "The Couterflow Pipeline Processor Architecture", Fall 1994, Design & Test of Computers, IEEE, vol.: 11, Issue: 3, pp. 48–59.*
Hauck, Scott, "Asynchronous Design Methodologies: An Overview", Jan. 1995, Proceedings of the IEEE, vol. 83, No. 1, pp. 69–93.*

* cited by examiner

*Primary Examiner*—Eddie Chan
*Assistant Examiner*—Charles Harkness
(74) *Attorney, Agent, or Firm*—Roy W. Truelson (57) ABSTRACT

An apparatus and method for externally managing data within an asynchronous pipeline. The asynchronous pipeline over which control is sought includes a data path and a control path. In accordance with the method of the present invention, a data tag value is assigned to the data prior to its entry into the asynchronous pipeline. The data tag value is sent into the control path at the same time the data is sent into its data path such that the data tag value passes through the asynchronous pipeline in parallel with the data to which it is assigned. At a given stage within the asynchronous pipeline, the data tag value is compared with a control tag value, and only in response to the data tag value matching the control tag value is the data permitted to pass to the next stage within the asynchronous pipeline.

15 Claims, 5 Drawing Sheets

ASYNCHRONOUS PIPELINE CONTROL INTERFACE USING TAG VALUES TO CONTROL PASSING DATA THROUGH SUCCESSIVE PIPELINE STAGES

BACKGROUND OF THE INVENTION

1. Technical Field

The present invention relates in general to asynchronous logic circuits, and in particular, to an asynchronous control circuit. More particularly, the present invention relates to a tag logic interface for introducing synchronous control signals within an asynchronous pipeline.

2. Description of the Related Art

Improvements in microprocessor performance are often measured in terms of instructions per cycle divided by cycle time. In such terms, microprocessor performance may be improved by either increasing the amount of useful work per cycle or by reducing cycle time. The total amount of work per cycle can be increased by executing multiple instructions in parallel and by avoiding stall conditions through speculation and out-of-order processing.

Increasing processor frequency is commonly achieved through either improvements in Complementary Metal Oxide Semiconductor (CMOS) devices or by adding processing stages within the processing architecture to reduce the amount of processing work per stage, or equivalently, per cycle. In comparison with most microarchitectural mechanisms that aim to increase the amount of work per cycle, improving system frequency imparts a more predictable benefit to overall system performance and therefore resonates more strongly in the marketplace.

At some point, however, performance benefits derived from both the improvements in micro-device design and reduction in logic levels begin to diminish. Increasing power dissipation requirements and increasing leakage currents provide some indication that CMOS technology is reaching its limits.

Pipelining is a well-known technique for improving processor performance. Pipelining is commonly utilized for decomposing a data processing operation into multiple concurrently operating stages to increase throughput at the cost of a moderate increase in latency and logic overhead. A wide variety of applications, such as digital signal processors, video processors, as well as general purpose processors can take advantage of pipeline architecture. Each of these applications may advantageously utilize pipelining to process data in stages where the processing result of one stage is passed to a subsequent stage for further processing. A pipeline consists of multiple processing stages that are connected together into a series of stages with the stages operating on data as the data passes along from one stage to the next.

There are a variety of distinctions among pipeline processors. One distinction being whether the pipelined stages operate in unison in accordance with an external global clock (a synchronous pipeline), or operate independently based on local events (an asynchronous pipeline).

In synchronous pipelines, synchronization of the different processing stages requires that the frequency of the global control clock accommodate the foreseeable worst-case delay for the slowest processing stage. Thus, in a synchronous pipeline design, some processing stages will complete respective operations earlier than other stages and must then wait for all processing stages to complete their operations. The speed of synchronous processing is directly controlled by the global clock frequency and thus can be increased by increasing the speed of the global clock.

A problem with increasing the synchronous clock frequency is clock skew. A circuit can operate synchronously only if all parts of the circuit receive a clock signal at the same time. However, clock signals are delayed as they propagate through the system and, even on a single chip, clock skew is a problem at higher frequencies. Additionally, as cycle time is reduced, synchronous pipeline efficiency is also reduced due to the constant clocking and latching overhead per cycle.

Asynchronous pipelines avoid worst-case timing and clock skew problems since they include no external clock to govern the timing of state changes among the pipelined stages. Instead, asynchronous stages exchange data at mutually negotiated times with no external timing regulation. More specifically, these mutually negotiated exchanges are locally synchronized using event-driven communication in which logic transitions on control lines act to request the start of a transfer and acknowledge its completion. By removing the global clock, asynchronous pipelines have the advantage of elimination of clock skew problems, freedom from worst-case design restrictions, and automatic power-down of unused circuitry.

A "micropipeline" is a common asynchronous pipeline design invented by Ivan Sutherland as set forth in U.S. Pat. No. 4,837,740 and U.S. Pat. No. 5,187,800, the pertinent portions of which are incorporated herein by reference. The approach in Sutherland's micropipeline utilizes bundled data with a transition-signaled handshake protocol to control data transfers.

An "asynchronous interlocked pipeline" is an alternate design discussed in detail in the ISSCC Conference, paper WA 17.3, titled "Asynchronous Interlocked Pipelined CMOS Circuits," incorporated herein by reference. This type of pipeline circuitry utilizes latches to divide up the pipeline, wherein as with Sutherland's micropipeline, local handshaking replaces global clocking.

Asynchronous pipelines work well as an island of logic but at some point the asynchronous logic must interact with the overall synchronous design. Such interaction is problematic because the variable delay through asynchronous pipelines results in timing mismatches with synchronous latches.

One known solution to asynchronous/synchronous interfacing employs a synchronous delay chain. A number of synchronously controlled latches are connected in series with the number of latches in the chain being determined in accordance with the worst-case anticipated delay through the asynchronous pipeline. When data is sent through the asynchronous pipeline, a valid bit is simultaneously sent through the delay chain as a point of reference for when the synchronous logic can expect the asynchronous data to arrive. Such an interface technique suffers the obvious disadvantage of using the worst-case asynchronous delay as a timing limitation.

From the foregoing, it can be appreciated that a need exists within an asynchronous pipeline architecture for an improved interface between asynchronous and synchronous logic that would permit external management of asynchronous data as it travels through an asynchronous pipeline.

SUMMARY OF THE INVENTION

An apparatus and method for externally managing data within an asynchronous pipeline are disclosed herein. The asynchronous pipeline over which control is sought includes a data path and a control path. In accordance with the method of the present invention, a data tag value is assigned to the data prior to its entry into the asynchronous pipeline. The data tag value is sent into the control path at the same time the data is sent into its data path such that the data tag value passes through the asynchronous pipeline in parallel with the data to which it is assigned. At a given stage within the asynchronous pipeline, the data tag value is compared with a control tag value, and only in response to the data tag value matching the control tag value is the data permitted to pass to the next stage within the asynchronous pipeline.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

This invention is described in a preferred embodiment in the following description with reference to the figures. While this invention is described in terms of the best mode for achieving this invention's objectives, it will be appreciated by those skilled in the art that variations may be accomplished in view of these teachings without deviating from the spirit or scope of the present invention.

Figure 1:
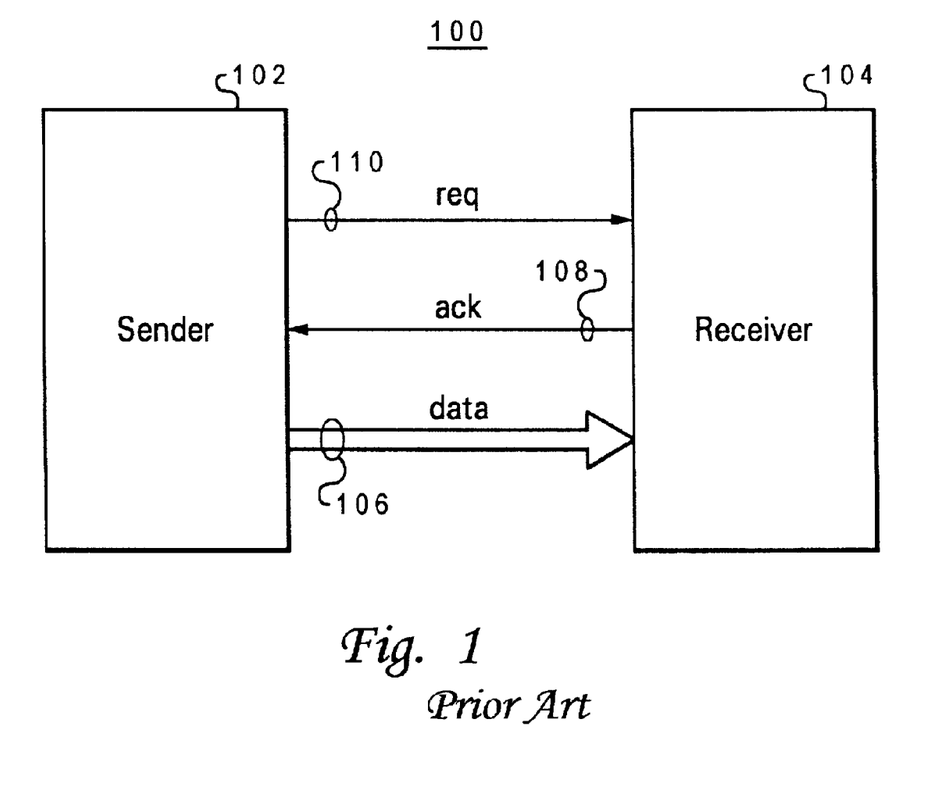
FIG. 1 is a block diagram illustrating a conventional asynchronous pipeline control and data transfer interface.

With reference now to the figures wherein like reference numerals refer to like and corresponding parts throughout, and in particular with reference to FIG. 1, there is depicted a block diagram of a sender/receiver interface within a conventional micropipeline. Two stages of a conventional asynchronous pipeline 100 are depicted in FIG. 1, including a sender stage 102 that delivers data in accordance with an asynchronous pipeline handshake protocol to a receiver stage 104. As depicted in FIG. 1, the interface between sender stage 102 and receiver stage 104 includes a data path 106. A request line 110 and acknowledge line 108 are delivered over control paths.

A request signal from sender stage 102 to receiver stage 104 is delivered by a logic transition on line 110 when data at the output of sender stage 102 is valid (ready to be delivered to receiver stage 104). An acknowledge signal from receiver stage 104 to sender stage 102 is delivered by a logic transition on acknowledge line 108 when the data has been processed by receiver stage 104. This data transfer control protocol results in no upper bound delay between consecutive events. As long as the data bundling constraints are met (i.e., the data transfer occurs in accordance with the handshake protocol described above), asynchronous pipeline 100 is delay-insensitive.

Figure 2:
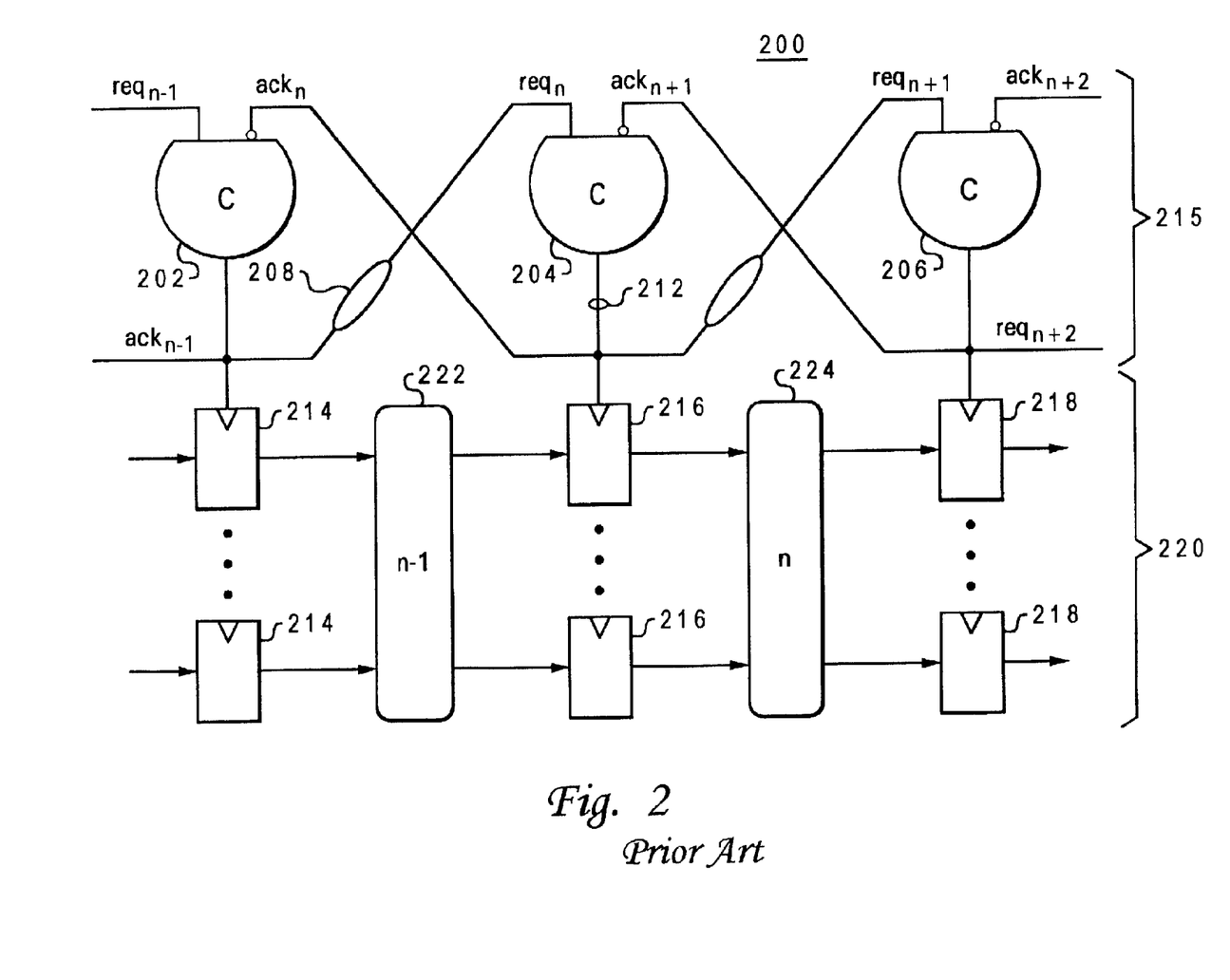
FIG. 2 depicts a conventional asynchronous pipeline architecture.

With reference to FIG. 2, there is illustrated a conventional asynchronous pipeline 200 related to FIG. 1. A data path 220 within asynchronous pipeline 200 includes data processing stages 222 and 224 wherein data is processed in accordance with within combinatorial logic functions n−1 and n.

Data path 220 further includes a series of level-sensitive half-latches 214, 216, and 218 that hold and propagate data between processing stages 222 and 224 as well as previous and subsequent processing stages not depicted. A wide variety of latch designs are available for latches 214, 216 and 218 including, for example, level-sensitive D-latches. In accordance with well known level-sensitive half-latch operating principles, a particular control signal polarity (high or low) will cause such latches to open and thus become transparent to data at their inputs. The sequence and timing of the latching stages must be carefully set to prevent data collisions among the respective data processing stages. In the depicted example, it is assumed that latches 214, 216, and 218 are opened upon receiving a high control signal.

Asynchronous pipeline 200 further includes a control path 215 comprising multiple control elements for providing sequential data transfer control between data processing stages 222 and 224. Specifically three Muller C-elements 202, 204, and 206 are utilized to implement such asynchronous pipeline control.

A detailed description of Muller C-elements is provided in by Sutherland in Micropipelines, 32 Communications of ACM 720 (1989), the subject matter of which is incorporated herein by reference. Alternative logic configurations for constructing a C-element such as those depicted in U.S. Pat. No. 5,732,233 (1998) are well-known in the art and are incorporated herein by reference.

In accordance with well-known C-element operating principles, the control output of any of C-elements 202, 204, or 206 changes state, regardless of its previous state, only after both of its req and ack inputs have changed state. Otherwise, each C-element retains its current state. Thereafter, if either one of req or ack changes states, the output remains unchanged from the immediately preceding state. When both req and ack have changed from high to low, or from low to high, the output also changes from high to low, or from low to high, as the case may be.

The req and ack lines depicted in FIG. 2 form an inter-stage handshake interface between C-elements 202, 204, and 206. Each of the req signals that are applied as inputs to each C-element, originate as output data transfer enable signals from a previous stage. Each C-element also receives an ack input that is delivered from the output of the immediately subsequent C-element.

In addition to serving as handshake control signals req and ack, the outputs from each of C-elements 202, 204, and 206 are utilized as control inputs for level-sensitive latches 214, 216, and 218, respectively. Assuming positive level activation for the latches, a logic high produced as the latch control signal from a C-element results in opening the corresponding latch.

To pass data through latches 214 into processing stage 222, C-element 202 asserts a data transfer enable signal at its output. The asserted data transfer enable signal propagates through a delay device 208 to assert $req_n$ at the input of C-element 204. Delay device 208 is included within the control line connecting the output of C-element 202 to the input of C-element 204 to delay the assertion of $req_n$ with respect to the activation signal applied by C-element 202 to latches 214 to ensure that the data is valid at the input of latches 216 prior to C-element opening latches 216.

Upon receipt of $req_n$, and assuming that $ack_{n+1}$ is low, C-element 204, having received two logic highs at its inputs, produces a logic high at its output 212 thus opening level-sensitive latches 216 and allowing the data to pass through to processing stage 224.

The asserted data transfer enable signal at output 212 asserts $ack_n$ at the input of C-element 202. The rising edge of $ack_n$ indicates that the data has been received and processed by processing stage 224. In accordance with the foregoing description of C-element behavior, the assertion of $ack_n$ together with the de-assertion (high-to-low) of the $req_{n-1}$ input to C-element 202 results in the data transfer enable signal at the output of C-element 202 being de-asserted and latches 214 being closed. The de-asserted transfer control signal at the output of C-element 202 is delayed through delay device 208 before de-asserting $req_n$ at the input of C-element 204.

The acknowledge input to C-element 204, $ack_{n+1}$, has been asserted in sequence in the same manner as that described for $ack_n$ by the time $req_n$ has been de-asserted. Upon de-assertion of $req_n$ and assertion of $ack_{n+1}$, data transfer control output 212 is de-asserted, resulting in the de-assertion of $ack_n$. The falling edges of $req_n$ and $ack_n$ at the inputs of C-elements 204 and 202, respectively, comprise the recovery phase of the four-phase protocol during which no data transfer occurs across processing stages 222 and 224.

Conventionally, a pre-determined delay technique is utilized to interface synchronous control systems with an asynchronous pipeline, such as asynchronous pipeline 200. Such a technique is typically limited by the number of synchronous cycles consumed in a worst-case delay experienced by data as it traverses the asynchronous pipeline. As described herein with reference to FIGS. 3, 4, and 5, the present invention provides an improved interface between asynchronous and synchronous logic that would permit external management of asynchronous data as it travels through the pipeline without resorting to a predetermined worst-case delay technique.

Figure 3:
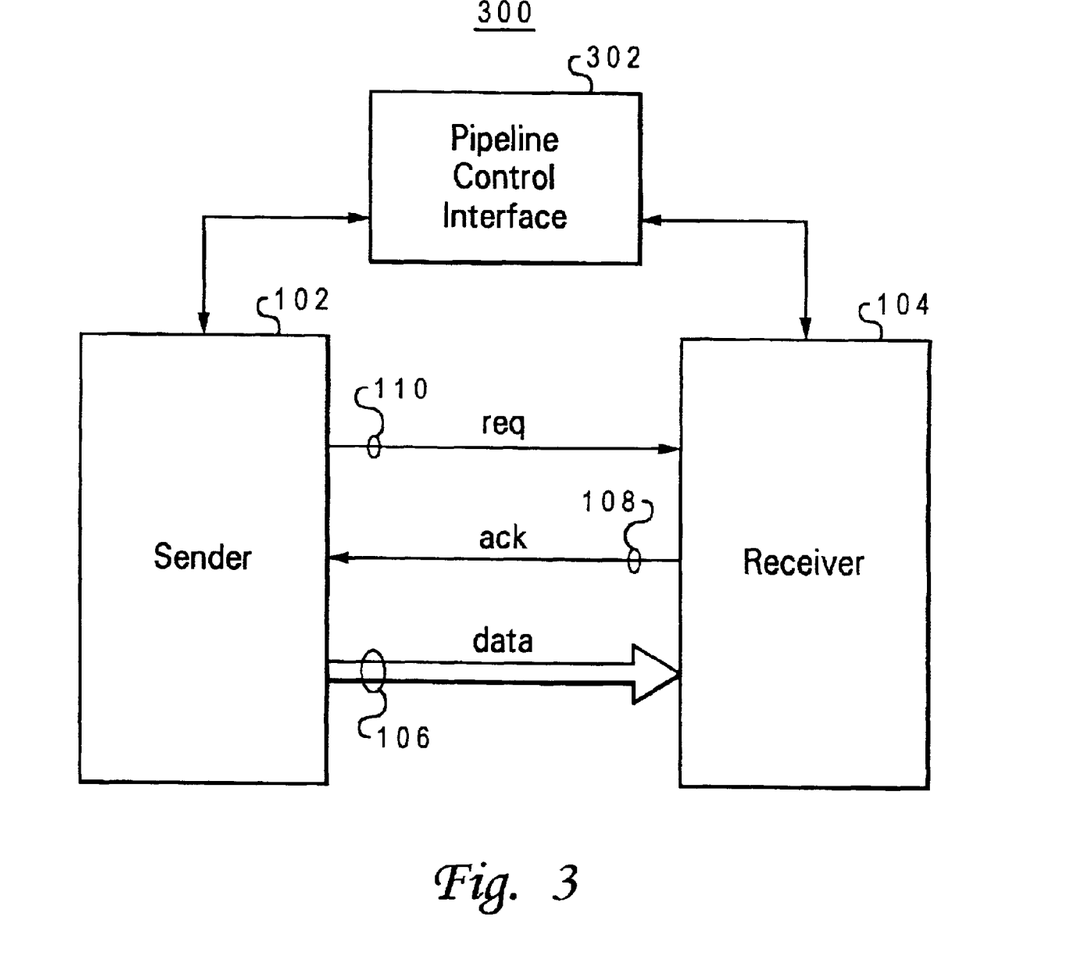
FIG. 3 is a block diagram illustrating an asynchronous pipeline incorporating an external control interface, in accordance with a preferred embodiment of the present invention.

With reference now to FIG. 3, there is depicted a block diagram illustrating a sender and receiver stage of an asynchronous pipeline incorporating an external control interface in accordance with a preferred embodiment of the present invention. As shown in FIG. 3, an asynchronous pipeline 300 includes sender stage 102 that delivers data to receiver stage 104. Like the conventional asynchronous pipeline depicted in FIG. 1, data path 106 is provided though asynchronous pipeline 300 at the interface between sender stage 102 and receiver stage 104. Moreover, the same request line 110 and acknowledge line 108 are delivered over a local control path. Unlike conventional asynchronous pipeline 100, however, the transmission of data from sender 102 to receiver 104 within asynchronous pipeline 300 is controlled by an additional pipeline control interface 302 in addition to the local control provided by the asynchronous pipeline handshake protocol described with reference to FIG. 1.

Figure 4:
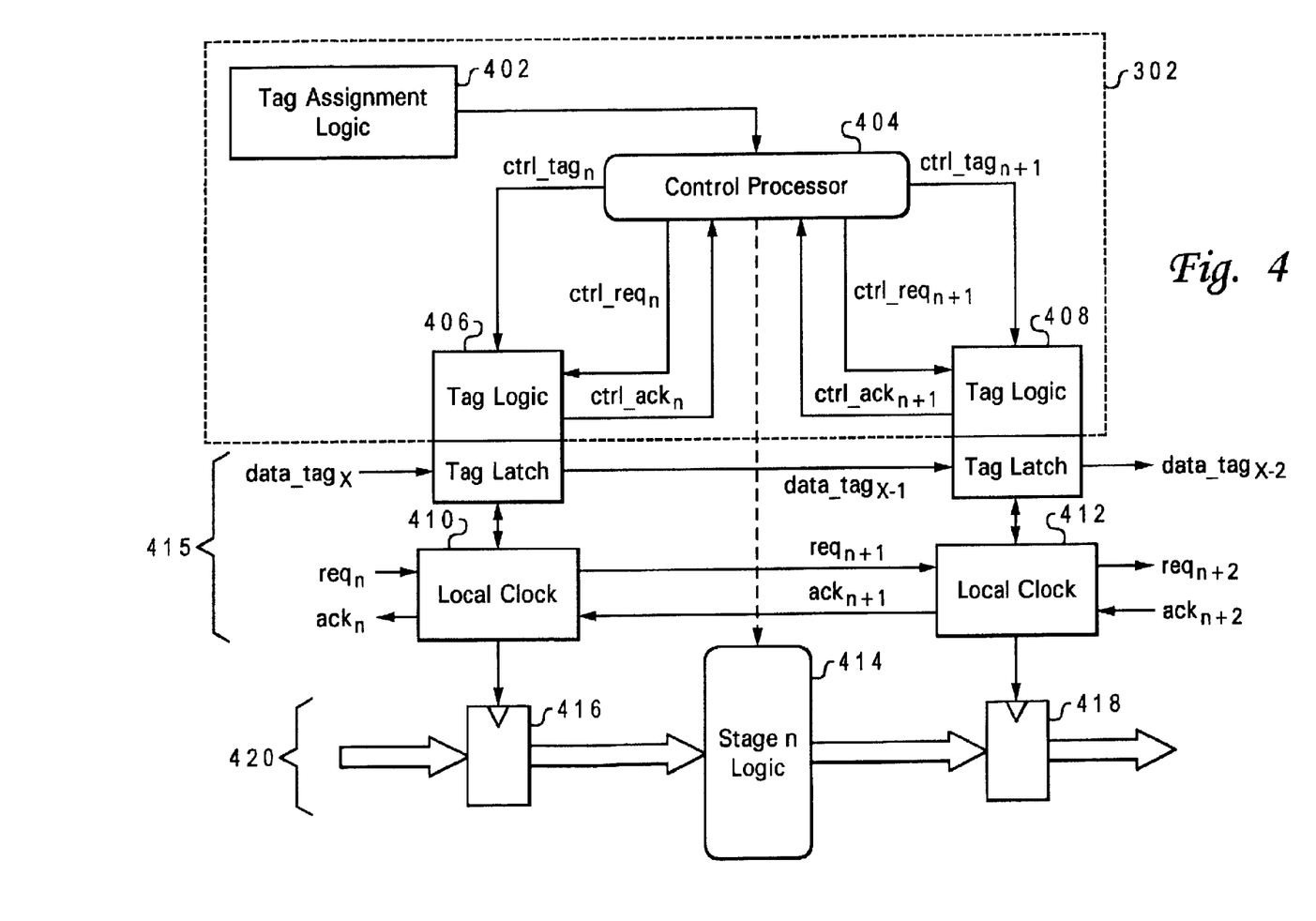
FIG. 4 depicts an external control interface implemented within an asynchronous pipeline, in accordance with a preferred embodiment of the present invention.

Referring to FIG. 4, there is depicted an external control interface implemented within an asynchronous pipeline in accordance with a preferred embodiment of the present invention. The asynchronous pipeline illustrated in FIG. 4 includes pipeline control interface 302 together with a local pipeline control path 415 and a data path 420.

Pipeline control interface 302 employs a tag assignment logic module 402 for tagging pipeline data such that the data can be uniquely identified as it passes through various stages. In one embodiment, tag assignment logic module 402 associates an encoded binary string with a particular bundle of data as it enters the pipeline. In an alternate embodiment, the tag associated with a data bundle may be a number of mutually exclusive bit lines. In still another embodiment, a combination of an encoded number and mutually exclusive bit lines may be used.

The assigned data tag value, $data\_tag_x$, is delivered into pipeline control interface 302 when the data to which it is assigned is sent into data path 420 such that $data\_tag_x$ passes through the asynchronous pipeline in parallel with the data. The synchronicity required for such parallel transfer is achieved by a control interface handshake protocol within pipeline control interface 302 acting in concert with the handshake protocol performed within local pipeline control path 415.

Pipeline control interface 302 further includes a processor 404 that is in communicative contact with data logic stage n. A control tag, $ctrl\_tag_n$ is assigned a particular control tag value under the direction of processor 404. The assignments of data tag values, such as $data\_tag_x$, are delivered to processor 404 from tag assignment logic 402, such that processor 404 can correlate its assignment of a control tag value with the value of a given data tag. The value of $ctrl\_tag_n$ is set with respect to the particular data tag value assigned to data arriving at the input of a latch 416. Thus, when data corresponding to $data\_tag_x$ arrives at latch 416 (the input of data processing stage n), processor 404 sets the value of $ctrl\_tag_n$ with respect to $data\_tag_x$ and delivers $ctrl\_tag_n$ to tag logic module 406.

Tag logic module 406 that receives both $ctrl\_tag_n$ and $data\_tag_x$ as inputs. Tag logic module 406 compares $ctrl\_tag_n$ and $data\_tag_x$ to determine whether or not they match. In response to a determination that $ctrl\_tag_n$ matches $data\_tag_x$, tag logic module 406 delivers an enable signal to local clock 410. It should be noted that local clock comprises logic required for local asynchronous flow control (the C-elements and associated request and acknowledge lines depicted in FIG. 2, for example) as well as additional functionality required to provide upper-level control by tag logic module 406. There are a variety of possible techniques by which an enable signal from tag logic module 406 can be utilized to supersede the local control path handshaking within local pipeline control interface 415. In the depicted embodiment, a logic AND circuit can be implemented within local clocks 410 and 412 for combining the enable signal with an incoming request signal to initiate the latch control signals into latches 416 and 418. Thus, in the absence of an enable signal from tag logic module 406, local clock will be unable to open latch 416. Upon receipt of an enable signal from tag logic module 406, local clock 410 delivers a latch control signal to latch 416 such that data tagged with $data\_tag_x$ passes from latch 416 to data logic stage n. In order to maintain a parallel track between $data\_tag_x$ and its associated data, the same latch control signal that is delivered to latch 416 is also delivered to a data tag latch within tag logic module 406 such that $data\_tag_x$ is passed to tag logic module 408.

If, however, tag logic module 406 determines that $ctrl\_tag_n$ does not match $data\_tag_x$, tag logic module will not deliver a signal enabling local clock 410 to pass the data. Thus, by selecting the value for ctrl_tag$_n$, processor 404 may stop the data flow through data path 420 as necessary. This capability is useful for synchronizing the asynchronous pipeline data flow with external processing activities during exceptions or stall conditions that may occur in synchronous processes.

The assignment of a control tag value by processor 404 thus supersedes the local handshake protocol within local pipeline control path 415 as the final determinant of whether or not the data entering a particular stage may pass to the next. Such upper-level data flow control in which data tags are utilized to track particular data as it passes through the pipeline enables synchronous control logic (i.e., processor 404) to interface with asynchronous data at any given stage in the pipeline. For example, data within the asynchronous pipeline that becomes invalid due to external processing events such as cache misses may be flagged as bad by processor 404 as the data enters any given stage. In addition, processor may selectively perform additional processing on a particular data bundle at any given stage in the pipeline.

In one embodiment of the present invention, a control interface protocol exchanged between processor 404 and tag logic module 406 is used to govern transfer of data through latch 416 as follows. When data that has been assigned data_tag$_x$ arrives at the input of closed latch 416, local clock 410 waits for a request signal, req$_n$, from the previous local clock indicating that the data at the input of latch 416 is valid. The assigned data tag, data_tag$_x$, arrives at tag logic module 406 at the same time the data arrives at the input of latch 416. While local clock 410 waits for req$_n$, tag logic module 406 waits for a control request signal, ctrl_req$_n$, indicating that the value ctrl_tag$_n$ has been set by processor 404.

Upon receipt of ctrl_req$_n$, tag logic module 410 compares ctrl_tag$_n$ with data_tag$_x$ to determine whether or not they match. If so, the data is permitted to pass through latch 416 into stage n logic 414 wherein it is processed in accordance with the combinatorial logic therein with possible input from processor 404. Local clock 410 acknowledges that it has received the data from the previous stage via ack$_n$ while tag logic delivers a control acknowledge signal, ctrl_ack$_n$, to processor 404 indicating that it has received ctrl_tag$_n$.

Figure 5:
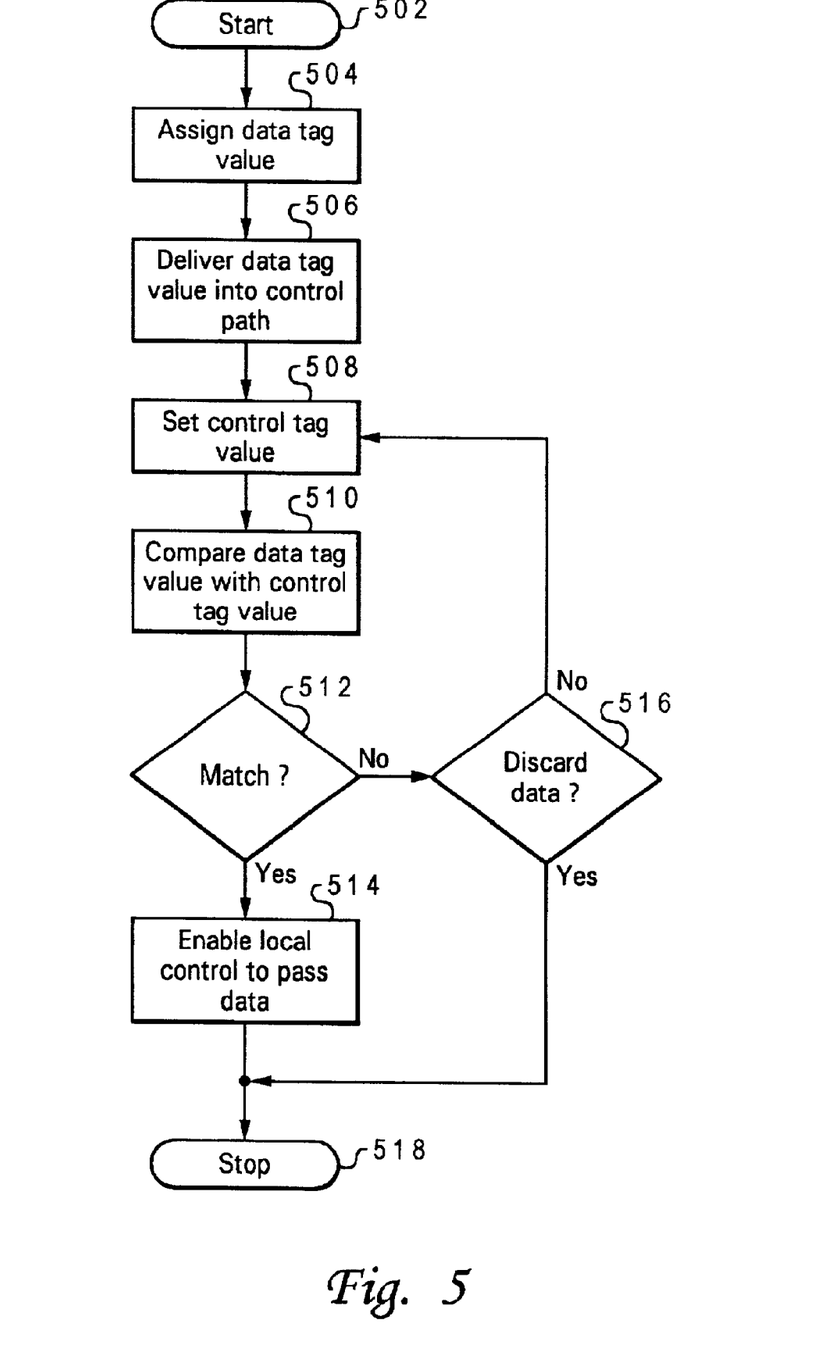
FIG. 5 is a flow diagram illustrating steps performed for externally managing data within an asynchronous pipeline, in accordance with a preferred embodiment of the present invention.

With reference now to FIG. 5, there is depicted a flow diagram illustrating steps performed for externally managing data within an asynchronous pipeline in accordance with a preferred embodiment of the present invention. The process begins at step 502 and proceeds to step 504 which depicts assignment of a data tag value to a particular data bundle. Next, as illustrated at step 506 the assigned data tag is delivered into the control path of the asynchronous pipeline at the same time its associated data is sent into the data path. As explained with reference to FIG. 4, the data tag traverses the pipeline in parallel with its associated data.

Proceeding to step 508, when the data tag arrives at a given stage in the pipeline, a control tag value is set with respect to the value assigned to the data tag. The data tag value is compared to the control tag value within tag logic module 406 as shown at step 510 to determine whether or not they match. As depicted at steps 512 and 514, if the data tag value matches the control tag value, the tag logic enables the local control path to pass the data into the next pipeline stage. If, however, the data tag value does not match the control tag value, a further determination is made at step 516 of whether or not the data should be discarded. If so, the process terminates as shown at step 518. If not, the process returns to step 508 wherein the control tag value is reset. As illustrated in FIG. 4, control request, ctrl_req, and control acknowledge, ctrl_ack, lines between the tag logic modules and processor 404 provide a medium and handshake mechanism for transferring control tag requests.

While the invention has been particularly shown and described with reference to a preferred embodiment, it will be understood by those skilled in the art that various changes in form and detail may be made therein without departing from the spirit and scope of the invention.

What is claimed is:

1. A method for externally managing data within an asynchronous pipeline, wherein said asynchronous pipeline includes a plurality of pipeline stages, and a data path and a control path traversing said plurality of pipeline stages in unison, said method comprising:

assigning a respective data tag value to each of a plurality of data sets, each said data set for input to said asynchronous pipeline in a respective input interval;

sending each said respective data tag value into said control path when said data set to which the respective data tag value is assigned is sent into said data path such that said respective data tag value passes through each successive stage of said plurality of stages of said asynchronous pipeline in unison with said data set to which the respective data tag value is assigned, each said respective data tag value always being in the same pipeline stage as the data set to which the respective data tag value is assigned; and comparing each said data tag value with a respective control tag value associated with a given stage of said asynchronous pipeline; and in response to a data tag value matching a respective control tag value, permitting said matching data tag value and the data set to which said matching data tag value is assigned to pass in unison to a next stage within said asynchronous pipeline, wherein passing of each said data tag value and the data set to which said matching data tag value is assigned to respective next stages of said plurality of pipeline stages within said asynchronous pipeline is not synchronized to a common global clock signal.

2. The method of claim 1, wherein said step of assigning a respective data tag value comprises associating a respective encoded binary sequence with each said data set.

3. The method of claim 2, wherein said comparing step further comprises decoding said encoded binary sequences to identify said data tag values.

4. The method of claim 1, further comprising delivering each said data tag value to a processor that is in communicative contact with said given stage.

5. The method of claim 4, further comprising:

assigning a respective control tag value with respect to each said data tag value; and delivering said control tag values from said processor to said given stage.

6. The method of claim 4, wherein said given stage includes a logic function for processing said data sets, said method further comprising:

determining whether or not each said respective control tag value matches each said data tag value; and in response to determining that a control tag value matches a data tag value, delivering a control instruction from said processor to said logic function.

7. The method of claim 1, wherein said assigning step further comprises:

receiving said data sets at the front-end of said asynchronous pipeline; and associating said data tag values with said data sets within a memory device.

8. A system for externally managing data within an asynchronous pipeline, wherein said asynchronous pipeline includes a plurality of pipeline stages, and a data path and a control path traversing said plurality of pipeline stages in unison, said system comprising:

processing means for assigning a respective data tag value to each of a plurality of data sets, each said data set for input to said asynchronous pipeline in a respective input interval;

processing means for sending each said respective data tag value into said control path when said data set to which the respective data tag value is assigned is sent into said data path such that said respective data tag value passes through each successive stage of said plurality of stages of said asynchronous pipeline in unison with said data set to which the respective data tag value is assigned, each said respective data tag value always being in the same pipeline stage as the data set to which the respective data tag value is assigned; and logic means for comparing each said data tag value with a respective control tag value associated with a given stage of said asynchronous pipeline, and in response to a data tag value matching a respective control tag value, permitting said matching data tag value and the data set to which said matching data tag value is assigned to pass in unison to the next stage within said asynchronous pipeline, wherein passing of each said data tag value and the data set to which said matching data tag value is assigned to respective next stages of said plurality of pipeline stages within said asynchronous pipeline is not synchronized to a common global clock signal.

9. The system of claim 8, wherein said processing means for assigning a respective data tag value comprises processing means for associating a respective encoded binary sequence with each said data set.

10. The system of claim 9, further comprising logic means for decoding said encoded binary sequences to identify said data tag values.

11. The system of claim 8, further comprising processing means for delivering each said data tag value to a processor that is in communicative contact with said given stage.

12. The system of claim 11, further comprising:

processing means for assigning a respective control tag value with respect to each said data tag value; and processing means for delivering said control tag values from said processor to said given stage.

13. The system of claim 11, wherein said given stage includes a logic function for processing said data sets, said system further comprising:

logic means for determining whether or not each said respective control tag value matches each said tag value; and processing means responsive to a control tag value matching a data tag value for delivering a control instruction from said processor to said logic function.

14. The system of claim 8, wherein said processing means for assigning a data tag value to said data further comprises:

processing means for receiving said data sets at the front-end of said asynchronous pipeline; and processing means for associating said data tag values with said data sets within a memory device.

15. An asynchronous pipeline apparatus for a digital data processing system, comprising:

plurality of ordered stages traversed in parallel by a data path and a control path, said data path transmitting data sets through successive said ordered stages of said pipeline, each data set entering said pipeline in a respective input interval, said control path transmitting data tags through successive said ordered stages of said pipeline, each data tag corresponding to a respective data set, each data tag being transmitted through each successive said ordered stage of said pipeline in unison with its corresponding data set, each said data tag always being in the same ordered stage of said pipeline as its corresponding data set; and stage advance control logic which controls the advancing of each said data set and its corresponding data tag through successive said ordered stages of said asynchronous pipeline, said stage advance control logic allowing each data set and its corresponding data tag to advance from a current stage to a successor stage upon satisfaction of a respective logical stage transition condition associated with each stage transition, wherein for at least some stage transitions, said logical stage transition condition includes the condition that the data tag at the current stage to matches a control tag value associated with the stage transition, wherein advancing of each data set and its corresponding data tag to respective successive stages of said plurality of ordered stages of said pipeline is not synchronized to a common global clock signal.

* * * * *

UNITED STATES PATENT AND TRADEMARK OFFICE
CERTIFICATE OF CORRECTION

PATENT NO. : 6,925,549 B2
DATED : August 2, 2005
INVENTOR(S) : Peter William Cook et al.

It is certified that error appears in the above-identified patent and that said Letters Patent is hereby corrected as shown below:

Column 10,
Line 7, "said tag" should be -- said data tag --.
Line 42, "stage to matches" should be -- stage matches --.

Signed and Sealed this

Twenty-seventh Day of September, 2005

JON W. DUDAS
*Director of the United States Patent and Trademark Office*